April 15, 1952  J. C. DANLY  2,593,115
CONTINUOUS OILING SYSTEM FOR PRESSES
Filed Nov. 26, 1947  3 Sheets-Sheet 3

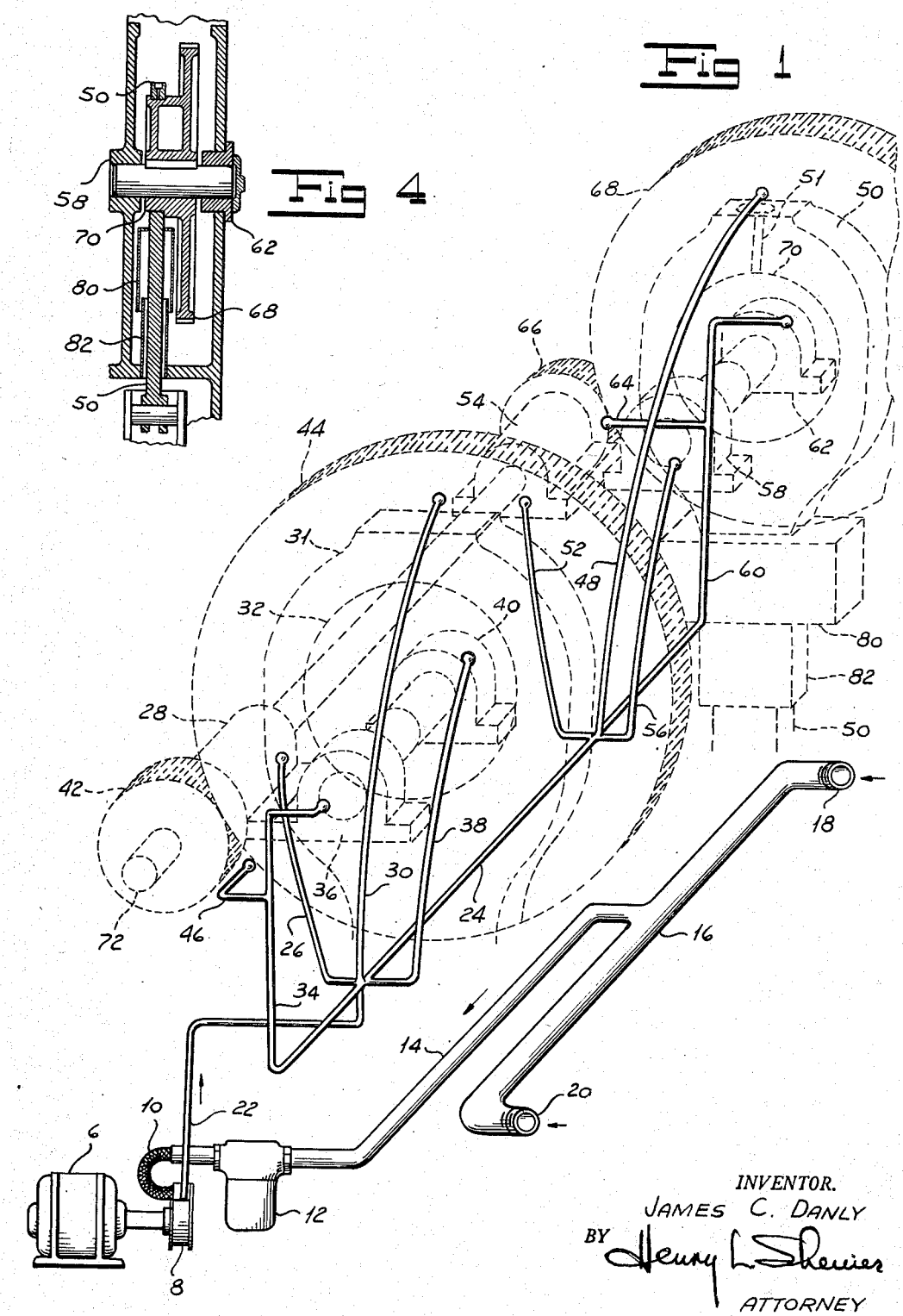

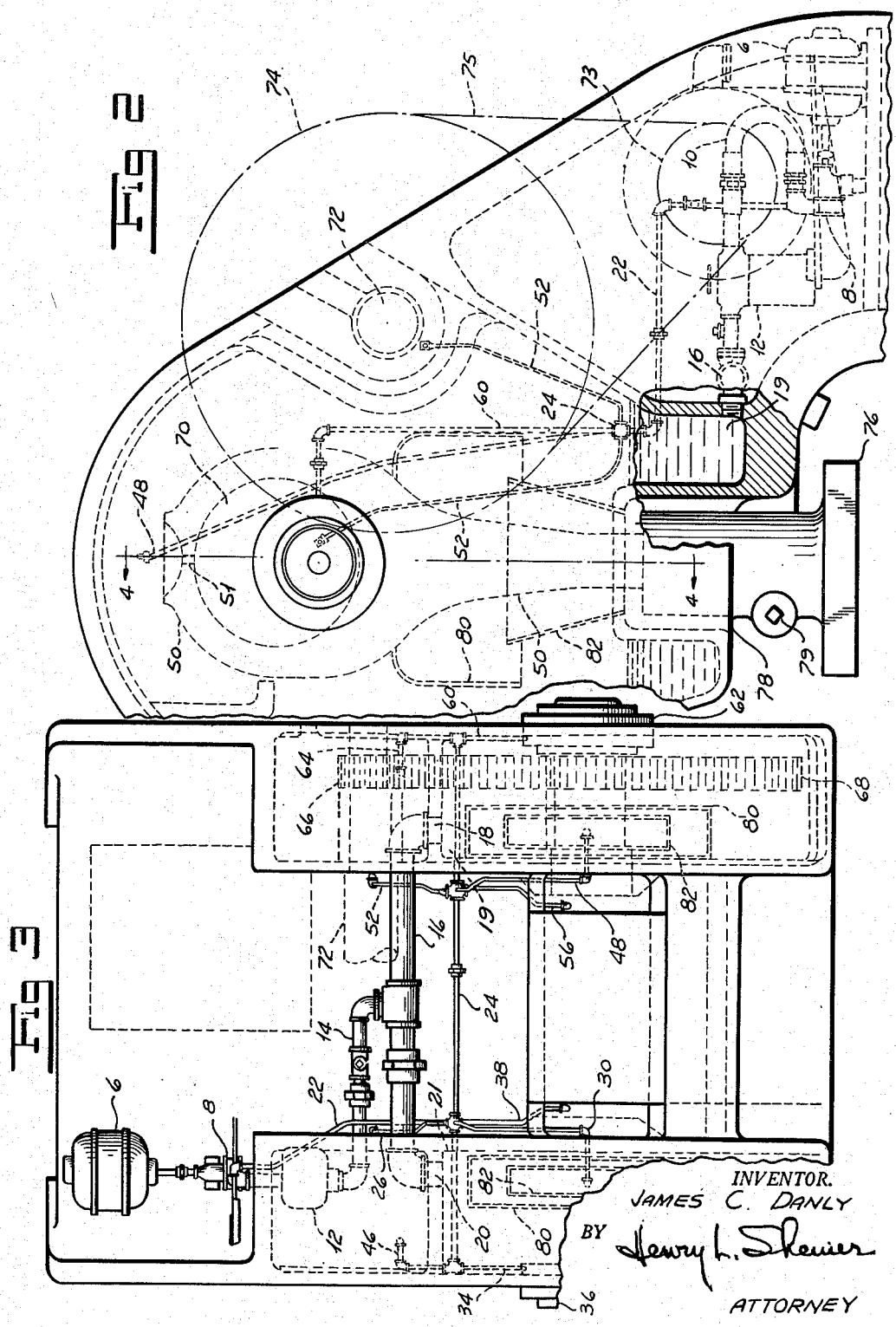

INVENTOR.
JAMES C. DANLY
BY Henry L. Shevier
ATTORNEY

Patented Apr. 15, 1952

2,593,115

UNITED STATES PATENT OFFICE 2,593,115

CONTINUOUS OILING SYSTEM FOR PRESSES

James C. Danly, River Forest, Ill., assignor to Danly Machine Specialties, Inc., Chicago, Ill., a corporation of Illinois Application November 26, 1947, Serial No. 788,239

6 Claims. (Cl. 184—6)

My invention relates to a continuous oiling system for presses and, more particularly, to an improved lubricating system for power presses in which oil is furnished to the principal working parts of the press at all times.

Power presses are expensive pieces of machinery and proper lubrication is essential if they are to give service over a long period of time. The power presses of the prior art have been provided with individual lubricating means for the various parts of the press. The gears of the power train usually run with a portion of the gear in a reservoir of oil and the rotation of the gears is relied upon to distribute oil to the contacting teeth. This usually results in oil being sprayed and, if the crown of the press is not oil-tight, oil leaks and frequently sprays over the operator of the press and the area adjacent the press. If the press has been standing idle for a period of time, the contacting gear teeth are substantially dry or insufficiently lubricated. The separate lubricating means which have been provided are frequently neglected or inadvertently allowed to run dry with the result that inadequate lubrication frequently occurs at various parts of the press.

One object of my invention is to provide a common lubricating means for the principal parts of the power press.

Another object of my invention is to provide a lubricating system for power presses in which the principal moving parts are positively and continuously provided with a lubricating medium.

Another object of my invention is to provide a continuous circulation system in which the lubricant from a central source is circulated from the principal moving parts, returned to the source and recirculated.

Another object of my invention is to provide a continuous lubricating system for power presses in which means are provided for preventing the spraying of oil over the work or the operator of the press.

Other and further objects of my invention will appear from the following description.

In the accompanying drawings which form part of the instant specification and which are to be read in conjunction therewith and in which like reference numerals are used to indicate like parts in the various views:

Fig. 1 is a diagrammatic perspective view showing my improved lubricating system;

Fig. 2 is an elevation of a portion of a press containing one embodiment of my improved lubricating system;

Fig. 3 is a plan view of the press shown in Fig. 2;

Fig. 4 is a fragmentary sectional view taken on the line 4—4 showing the improved baffle which forms part of my invention.

Figure 5:
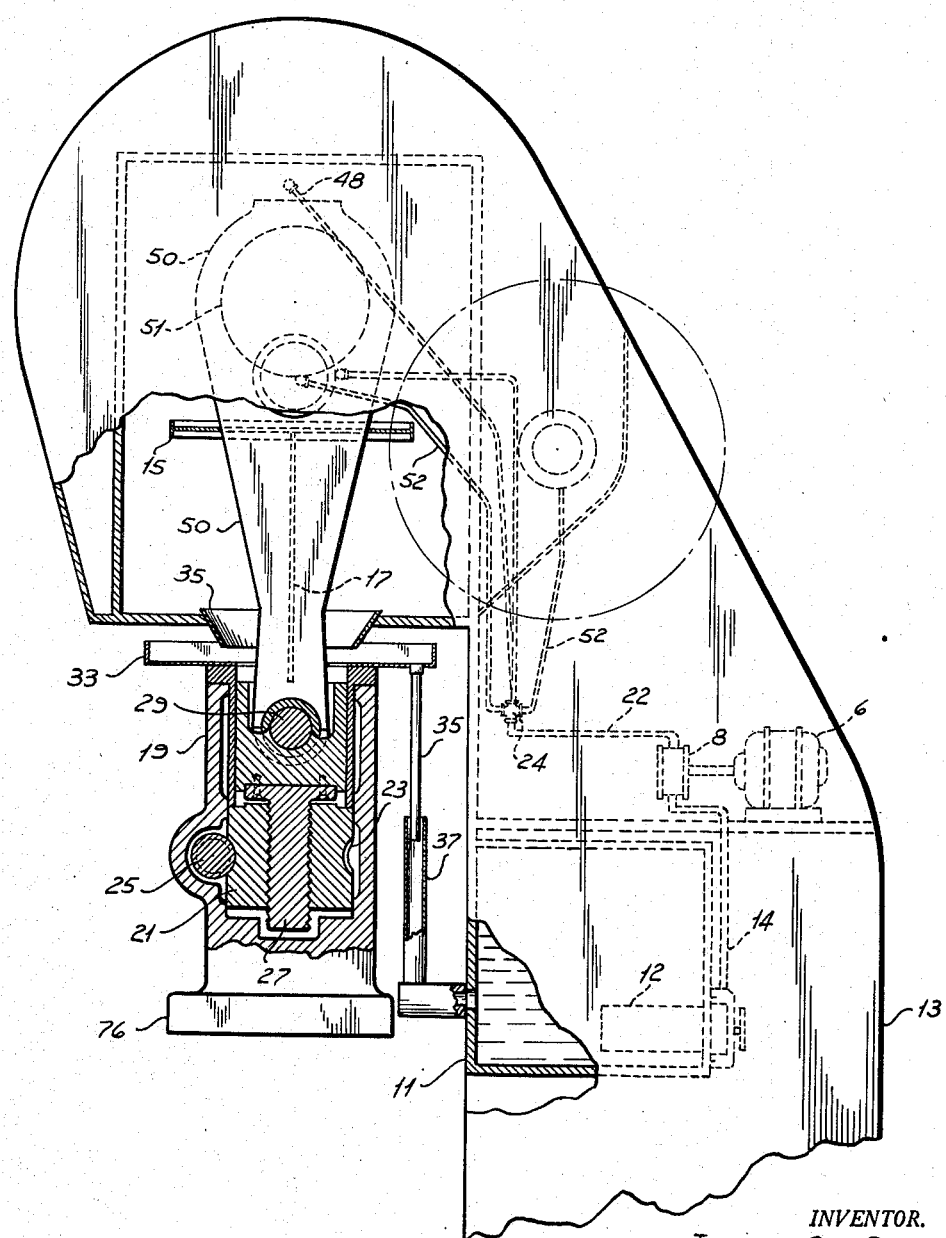
Fig. 5 is an elevation of a portion of a press containing another embodiment of my improved lubricating system.

In co-pending application of Philo H. Danly et al., Serial Number 783,746, filed November 3, 1947, now Patent No. 2,511,972, there is shown a circulating oil system for presses in which an oil reservoir or sump is carried on the ram of the press and continuous lubricating means are provided for circulating the oil from the reciprocating sump to working parts of the press carried by a stationary frame. A portion of the oil conduit comprises a trombone joint which constitutes an arrangement by which the oil is circulated from a reciprocating reservoir to stationary parts of the press.

In the present invention, the oil reservoir is carried by the stationary frame and lubricant is circulated to the working parts of the press therefrom. Inasmuch as one of the working parts comprises a pitman extending to and reciprocating the ram of the press, I provide a hood or umbrella baffle operating with an annular stationary baffle to prevent oil from being sprayed outside the crown of the press, thus preventing lubricant from escaping and protecting the operator of the press and the work. A continuously-running oil pump is provided with an intake pipe which communicates with an oil reservoir through an oil filter and distributes the oil to the drive shaft bearings, the eccentric, the eccentric shaft bearings, and the gears of the gear train. The oil is allowed to flow downwardly by gravity to return to the sump, whence it is recirculated. The pitman carries an umbrella baffle which co-acts with an annular baffle carried by the press frame to prevent oil which is being thrown about within the crown of the press from escaping.

Referring now to Fig. 1, the oiling system shown is applied to an inclinable frame press having a pair of eccentrics driving a pair of pitmans connected to a ram which is reciprocated thereby. It is to be understood that the system may be applied to any appropriate type of power press and that the press frame design is shown for purposes of illustration only and not by way of limitation.

In the particular design, the lower portion of the frame is formed with a pair of oil reservoirs or sumps 19 and 21, as can be seen by reference to Figure 3. A motor 6 continuously drives an oil pump 8 of any suitable construction. The pump takes oil through a flexible connection 10 from a filter 12 which communicates with an oil suction pipe 14. The oil suction pipe 14 takes oil in turn from a suction manifold 16, to which oil from the right hand sump 19 shown in Fig. 3 flows through pipe 18 and oil from the left hand sump 21 flows through pipe 20. The pump 8 discharges through pipe 22 into a manifold 24. A pipe 26 communicates with the manifold 24 and is adapted to discharge oil to the left hand drive shaft bearing 28. A pipe 30 communicates with the manifold 24 and is adapted to discharge oil to the top of the pitman 31 which is driven by eccentric 32. A pipe 34 communicates with the manifold 24 and is adapted to discharge oil to one bearing 36 for the shaft of eccentric 32. A pipe 38 communicates with the manifold 24 and is adapted to supply oil to the other bearing 40 of the shaft for eccentric 32. The drive shaft carries a pinion 42 which meshes with the gear 44 carried by the eccentric 32. A branch pipe 46 communicates with the pipe 34 and is adapted to supply oil to the contact point between drive shaft pinion 42 and eccentric gear 44.

A parallel system is provided for lubricating the companion eccentric. Oil passes from the manifold 24 through a pipe 48 to discharge at the top of right hand pitman 50, whence it will flow through a passage 51 to lubricate the right hand eccentric 70. A pipe 52 communicates with the manifold 24 and supplies oil to the right hand drive shaft bearing 54. Oil flows through pipe 56 from manifold 24 to lubricate one eccentric shaft bearing 58. Oil flows through pipe 60 from the manifold 24 to lubricate the other right hand eccentric shaft bearing 62. A branch pipe 64, communicating with the pipe 60, supplies lubricant to the contact point between drive shaft pinion 66 and the gear 68 which drives the eccentric 70. The oil thus supplied flows downwardly by gravity to the oil reservoirs, from which it is recirculated after being filtered by the filter 12.

The drive shaft 72 is driven from a constantly rotating flywheel 74, from which it is adapted to be clutched and unclutched as is well known to the art.

Referring now to Figs. 2 and 4, the pitman 50 driven by the eccentric 70 is attached to the ram 76 so that it, together with the pitman 31, may reciprocate the ram of the press. The pitman emerges from the press frame which encloses the actuating mechanism just described, through an opening 78 formed in the frame. In Fig. 2, the parts are shown at the upper end of the ram stroke. It will be observed that an umbrella baffle 80 is carried by the pitman. An annular baffle 82 is carried by the frame shrouding the opening through which the pitman 50 passes. The upper end of stationary baffle 82 nests a substantial distance within the lower end of umbrella baffle 80 at the upper end of the stroke. At the lower end of the stroke, the nesting of course is increased by the length of the stroke. The lower end of the umbrella baffle and the upper end of the annular baffle 82 form a circuitous passage, preventing oil being thrown about within the upper press housing from escaping through the opening 78 through which the pitman works.

In operation, the motor 6 is started, circulating oil to the drive shaft bearings 28 and 54, to the left hand eccentric shaft bearings 36 and 40, to the right hand eccentric shaft bearings 58 and 62, to the left hand pitman and eccentric through pipe 30 and to the right hand pitman and eccentric through pipe 48 and to the contact point between pinion 42 and eccentric gear 44 as well as to the contact point between pinion 66 and the eccentric gear 68. This lubrication is supplied before the press is placed in operation so that all parts are thoroughly supplied with lubricant. The motor 73, shown in Fig. 2, drives the flywheel 74 through any suitable transmission such as V belts or the like, indicated by the reference numeral 75. The flywheel is adapted to be clutched and unclutched to the drive shaft 72. When in unclutched position, the shaft 72 is immobilized by being clutched to a brake. The brake is released simultaneously with the clutching of the drive shaft 72 to the flywheel 74, as is common practice in the art. When the drive shaft is clutched to the flywheel, the eccentrics are driven to reciprocate the pitmans and hence the ram 76. The throw of the ram is adjusted by means of an adjusting mechanism, the end of which 79 appears in Fig. 2. Separate lubricating means are provided for this ram adjustment in my lubricating system. Excess oil from all of the bearings and the gears, the eccentric and the pitman flows downwardly by gravity and returns to the sump whence it is recirculated.

Referring now to Fig. 5, I have shown another embodiment of my invention. In this embodiment, the oil reservoir 11 is carried in the lower portion of the press frame 13. The baffle 80, in the form of the invention heretofore described, is replaced by a tray baffle 15 carried by the pitman 50. The tray baffle is provided with a drain pipe 17 leading to the housing 19 in which the adjustment mechanism for the ram 76 is housed. A nut 21 is provided with an external worm thread 23 co-acting with a worm 25 by which the nut is adapted to be rotated. The nut embraces a threaded stem 27 adapted to raise and lower the ram 76 with respect to the pin 29 to which the lower end of the pitman 50 is connected. The top of the housing 19 carries a collecting pan 33 into which oil from the various driving parts of the press being lubricated by my system is adapted to drain. Oil is directed from the crown of the press through a baffle 35 into the pan 33. A drain pipe 35 opens into a stand pipe 37 from which the oil drains into the reservoir 11, whence it is pumped by pump 8 through the distributing system heretofore described. Oil overflows from the housing 19 into the pan 33 and thence through drain pipe 35 back to the reservoir. It will be seen that, as the ram reciprocates under the influence of the pitman 50, the drain pipe 35 is adapted to reciprocate within the stand pipe 37.

In this form of the invention, all of the principal working parts of the press are lubricated continuously, including the adjusting mechanism for the ram 76 and the joint between the pitman and the ram.

It is believed that the operation of the form of the invention shown in Fig. 5 will be clear from the foregoing description. Oil is pumped from the reservoir 11 by the pump 8 to the distributing system described above. Oil also flows down the pipe 17 to fill the housing 19, whence it overflows into pan 33 and thence through drain pipe 35 back to the reservoir 11 through stand pipe 37. When the press operates, the reciprocation of the ram will not interfere with the return of the oil to the reservoir.

It will be seen that I have accomplished the objects of my invention. I have provided a common lubricating system for all moving parts of the power press with the exception of the ram adjustment by which the principal parts are positively and continuously supplied with a lubricant. I have provided a continuous circulating system in which the lubricant is taken from a central source, circulated to all moving parts, returned to the source, filtered and recirculated. I have provided a baffling system between a reciprocating pitman and a stationary press frame in which the danger of spraying oil over the work or the operator is avoided. I have eliminated a multiplicity of lubricating devices and have thus reduced the danger of improper lubrication due to neglect or inattention. The metal-to-metal contact between gears at the start of the operation is avoided by supplying oil to the gears continuously, irrespective of whether the press is running or not.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A power press including in combination a press frame formed with a housing, a substantially horizontal wall extending adjacent the bottom of the housing and formed with an opening, a ram carried by the frame for reciprocation outside of and below the housing, drive mechanism positioned in the housing, a pitman driven by the drive mechanism and drivingly connected to the ram and passing through the opening, a lubricant reservoir carried by the frame below the drive mechanism, a stationary lubricant-distributing manifold, stationary lubricant-distributing pipes providing continuous communication between the drive mechanism and the manifold, a lubricant pump, a prime mover for continuously pumping lubricant from the reservoir to the manifold, a hood baffle carried by the pitman within the housing, an annular baffle positioned within the housing adjacent the opening and extending in telescoped relation to the hood throughout the motion of the pitman and a lubricant return means providing communication between the housing and the reservoir.

2. A power press as in claim 1 in which said reservoir comprises a sump formed in the lower portion of said housing.

3. A power press as in claim 1 in which said frame is formed with a pair of housings, each having a reservoir, and a suction manifold communicating with both reservoirs.

4. A power press including in combination a press frame formed with a housing, drive mechanism within said housing, said housing being constructed with a passageway adjacent its lower portion, a ram carried by said frame for reciprocating below said housing, a pitman driven by said drive mechanism, means rockably connecting the lower end of said pitman to said ram for driving the same, said pitman extending through said passageway, a lubricant reservoir carried by said frame, a pump taking lubricant from said reservoir, a lubricant-distributing manifold, means providing communication between the pump discharge and said manifold, lubricant-distributing pipes communicating with said manifold and extending to working parts of said drive mechanism, a prime mover for actuating said pump, a baffle carried by said pitman within said housing and extending over said passageway, a tray carried by said ram, means for draining lubricant from said housing into said tray, a stand pipe having communication with said reservoir and a drain pipe providing communication between said tray and said stand pipe.

5. A power press as in claim 4 in which said baffle carried by said pitman comprises a ram, said ram being provided with adjusting mechanism for varying the position of said ram and a pipe providing communication between said pan baffle and said ram-adjusting mechanism.

6. In a power press having a lubricating system, a reservoir, means for pumping oil from said reservoir to the working parts of the press, said working parts including a substantially vertically positioned pitman connected to a ram reciprocated thereby, a baffle carried by said pitman below the working parts and having the form of a tray adapted to receive oil falling from the parts being lubricated by gravity, a pan carried by the ram, a pipe providing communication between said tray and said pan, a stand pipe providing communication with said reservoir and a drain pipe providing communication between said pan and said stand pipe.

JAMES C. DANLY.

REFERENCES CITED

The following references are of record in the file of this patent:

UNITED STATES PATENTS

| Number | Name | Date |
|---|---|---|
| 1,568,796 | Breer | Jan. 5, 1926 |
| 1,892,089 | Waseige | Dec. 27, 1932 |
| 1,898,994 | Ackerman | Feb. 28, 1933 |
| 2,160,778 | Dall | May 30, 1939 |